(No Model.)

D. C. RYDER.
ICE HANDLING IMPLEMENT.

No. 525,923. Patented Sept. 11, 1894.

Witnesses:
John W. Fisher
J. E. Marble

Inventor:
David C. Ryder
by William H. Low
Attorney.

United States Patent Office.

DAVID C. RYDER, OF CATSKILL, ASSIGNOR TO JOHN N. BRIGGS, OF COEYMANS, NEW YORK.

ICE-HANDLING IMPLEMENT.

SPECIFICATION forming part of Letters Patent No. 525,923, dated September 11, 1894.

Application filed May 31, 1894. Serial No. 513,007. (No model.)

*To all whom it may concern:*

Be it known that I, DAVID C. RYDER, of Catskill, in the county of Greene and State of New York, have invented a new and useful Implement for Removing Cakes of Ice from Ice-Canals, of which the following is a specification.

This invention relates to an implement for removing cakes and lumps of ice from canals formed in fields of ice for the purpose of conveying the cakes of harvested ice to the elevator preparatory to storing such cakes in an ice-house, and it consists of a suitable handle provided with one or more tines, or other suitable device, for passing beneath the piece of ice to be removed, and an arm hinged to said handle and arranged to be operated by means of a rod fitted to slide on said handle without the intervention of springs, levers, or other devices, in such manner that a pendent prong on the outer end of said arm will positively engage with the upper face of the piece of ice; said tines serving as runners on which the piece of ice can be moved on the ice-field to any suitable place on the latter.

Figure 1:
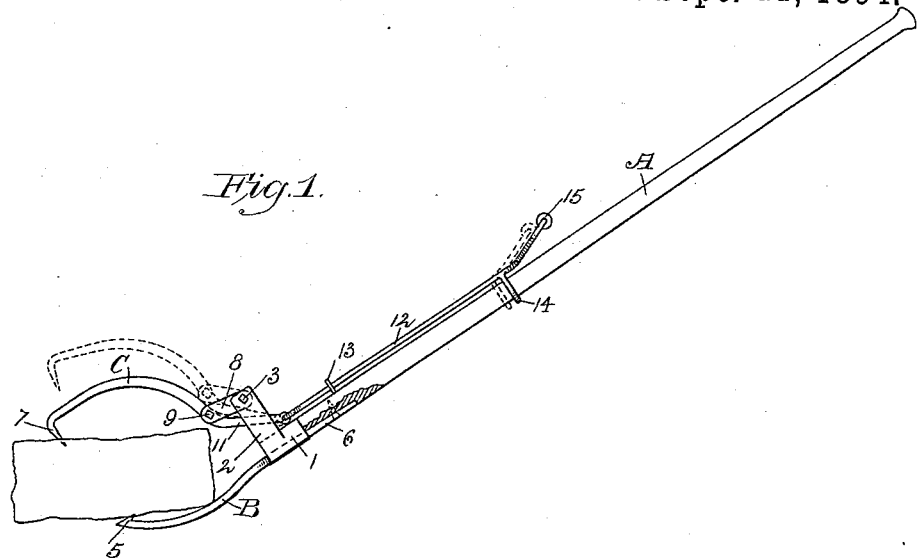
Figure 2:
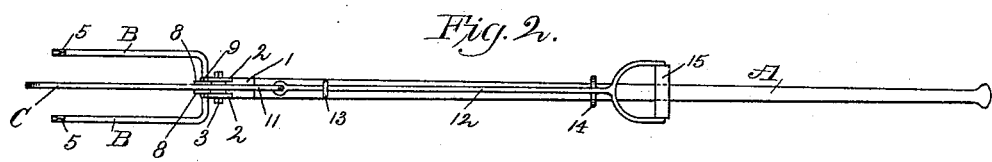
Figure 3:
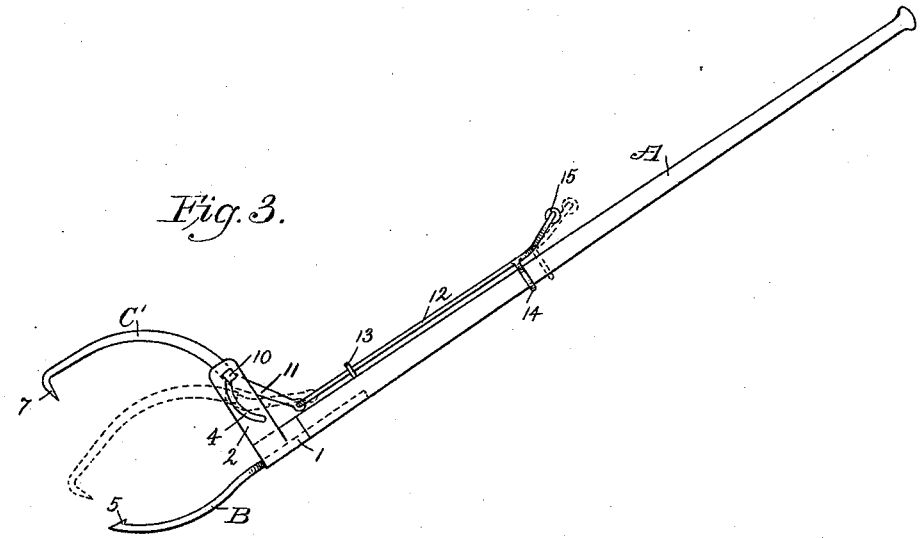

In the accompanying drawings, which are herein referred to and form part of this specification, Figure 1 is a side elevation of my implement attached to a cake of ice; Fig. 2, a plan view of my implement; and Fig. 3 is a side elevation of a modified form of my implement.

As represented in the drawings, A designates the handle of my implement, which is preferably made of wood and of suitable length and diameter. At one end of said handle a socket or ferrule, 1, is attached, and at one side of the latter a pair of lugs, 2, is formed to stand in parallel lines. As shown in Figs. 1 and 2, the upper part of said lugs is provided with an opening for receiving a pivot-bolt, 3, but as shown in Fig. 3 said lugs are provided with a slotted opening, 4, formed to a suitable curve, for a purpose shortly explained.

B designates tines, curved to form runners and preferably provided with a barb, 5, at the outer end. Said tines are secured to the end of the handle A directly under the lugs 2, and they are adapted to be passed into the water directly beneath a cake or lump of floating ice so that the latter will rest thereon in such manner that the barb 5 can enter the lower face of the ice and afford a firm hold thereto. Preferably the tines B are provided with an arm, 6, which is secured in the handle A in such manner that the ferrule 1 will embrace it and hold the tines securely to said handle.

C designates an arm or lever that is jointed to the lugs 2, directly over the tines B, in such manner that ample space will be left between said arm and tines to allow a cake of ice to enter said space, and bear against said lugs, without interfering with the action of said joint; said lever being fitted to swing vertically toward and from the tines B. Said arm is preferably bent to an arch-form and its outer end is provided with a pendent prong, 7, which is adapted to secure a firm hold on a cake of ice lying on the tines B, by reason of said prong striking into the upper face of said cake near the outer ends of the same, as shown in Fig. 1. As shown in Figs. 1 and 2 the arm C is pivoted to the outer end of a pair of links, 8, whose inner ends are pivoted on the pivot-bolt 3 in such manner that the outer ends of said links can have a swinging movement up and down, whereby the pivot, 9, for said arm will be shiftable, in respect to the tines B, and the outer end of the arm C, can be moved vertically to a greater distance from said tines than if pivoted directly to the lugs 2. As shown in Fig. 3 the arm C' is provided with pivots, 10, which are fitted to slide and rock in the curved slots 4 so as to effect the rising movement of said arm in a manner that is equivalent to that of the arm C previously described. In both arrangements of said arm—either C or C'—there is a limb, 11, extending toward the inner end of the handle A, and said limb is jointed to an operating-rod, 12, which is fitted to slide on said handle, on which it is guided by eyes, 13 and 14, the last of which is preferably formed on said rod and is fitted to slide on the handle A. The inner end of the operating-rod is usually bifurcated to receive a cross-handle, 15, on which an operative can secure a firm hold to slide the rod 12 vigorously when occasion requires.

My invention is operated in the following manner: An operative, standing by the canal or channel in which is floating the piece of ice that is required to be removed, immerses the tine-end of the implement into water—the arm C being previously raised, as indicated by dotted lines in Fig. 1, by pushing the operating-rod 12 toward the tines B—and carries the latter fairly under the piece of ice. Then, by pulling the operating-rod 12 in a direction away from said tine, the arm C is thrown down with sufficient force to insert the prong 7 into the top of the ice, the barbs 5 simultaneously engaging in the lower face of the ice, as shown in Fig. 1, and thereby the implement becomes secured to the ice. After this is accomplished, and while the piece of ice is still in the grasp of the implement, the operative tows the piece of ice to the side of the ice-field, and, by the curvature of the tines B, raises the piece to the surface of the ice-field; after which, by using the tines B as runners, the piece of ice can be removed to any place on the ice-field. To release the implement, the operating-rod 12 should be pushed toward the tines B and thereby the arm C will be raised to carry the prong 7 out of the piece of ice. Then the latter may be pushed from the tines B without effort.

What I claim as my invention, and desire to secure by Letters Patent, is—

1. An implement for removing pieces of ice, the same consisting of a handle having standing-lugs arranged adjacently to one end of the same, a pair of curved tines extending longitudinally from said handle directly under said lugs and adapted to be used as runners in removing the ice, an arm jointed to said lugs in such manner that a cake of ice can be interposed between the jointed end of said arm and the tines, and an operating-rod sliding on said handle and connected to said arm; said operating-rod being arranged to be operated in both directions by the hand of an operative, without the aid of springs, levers, or other mechanical devices, substantially as specified.

2. The combination of a handle, A, having a pair of tines, B, extending longitudinally from one of its ends; said tines being curved to form runners whereon the ice can be conveyed from place to place and each of said tines having a sharp barb, 5, formed on the outer end of its upper edge, an arm, C, arranged intermediately to said tines and jointed to standing-lugs, 2, on said handle; said arm being arranged in such manner that a cake of ice can be interposed between the jointed end of the arm and the tines without interfering with the action of said joint, and an operating-rod, 12, fitted to slide on said handle and jointed to said arm, substantially as and for the purpose specified.

3. The combination of a handle, A, having a pair of upwardly-curved tines, B, extending longitudinally from its outer end; said tines forming runners on which ice can be conveyed from place to place and each tine having a sharp barb, 5, formed on the outer end of its upper edge, an arm, C, having a sharp pendent-prong, 7, at its outer end and jointed to standing-lugs, 2, fixed on said handle and arranged intermediately to said tines; said arm being so formed and arranged that a cake of ice can be interposed between its jointed end and the tines without interference with the action of said joint, and an operating-rod, 12, fitted to slide on the handle A and jointed to the arm C, as and for the purpose specified.

4. The combination of a handle having tines at one end, a ferrule secured to said handle adjacent to said tines and provided with standing-lugs, links pivoted to said lugs, a lever fulcrumed to the outer end of said links and provided with a pendent prong, and an operating-rod connected to said lever and fitted to slide on said handle, substantially as specified.

DAVID C. RYDER.

Witnesses:
WARREN B. HOLMES,
J. R. HOLMES